UNITED STATES PATENT OFFICE.

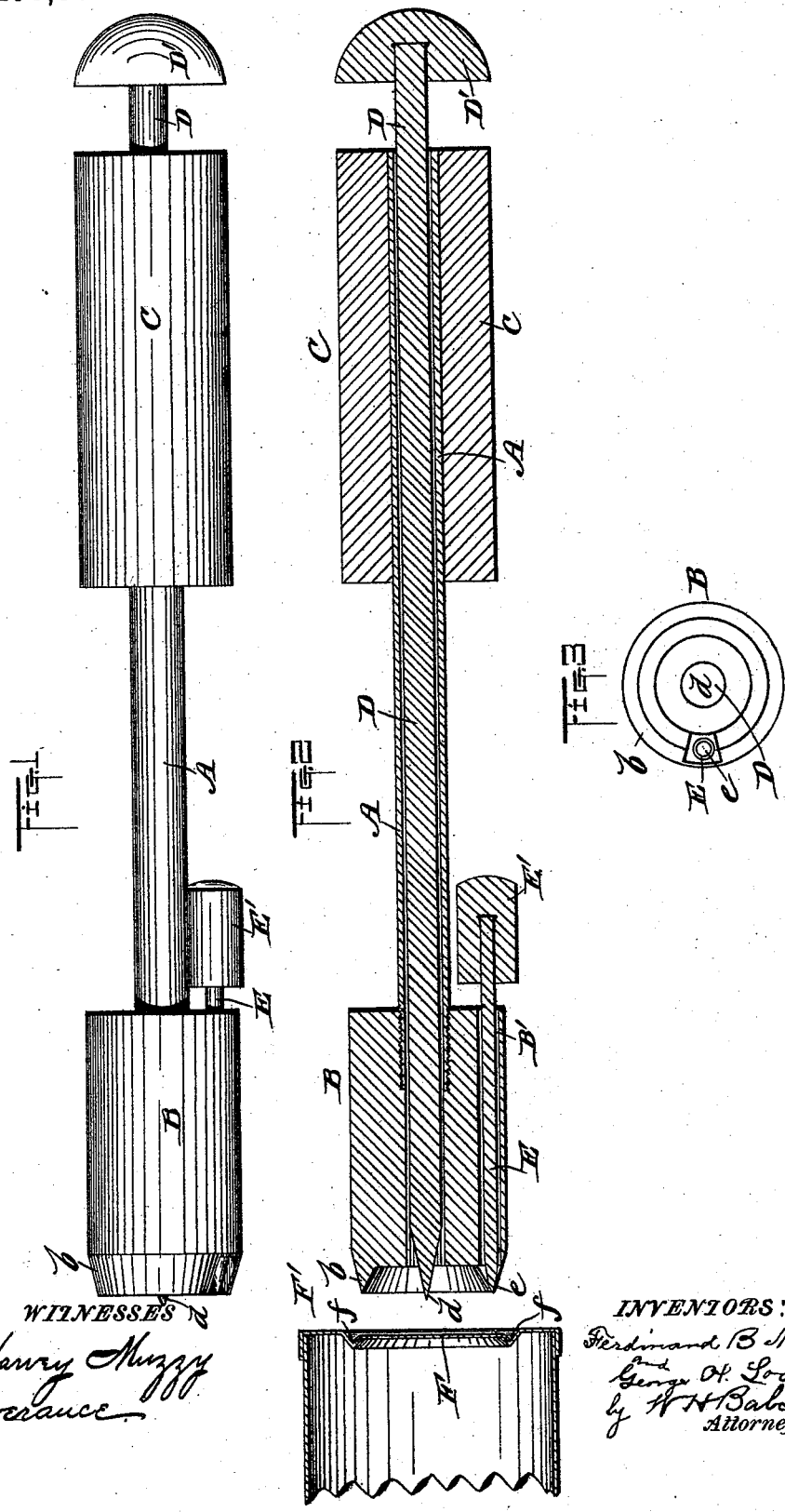

FERDINAND B. MERRILL AND GEORGE H. LOVELL, OF YARMOUTH, MAINE.

SOLDERING-IRON FOR CANS.

SPECIFICATION forming part of Letters Patent No. 498,359, dated May 30, 1893.

Application filed December 7, 1892. Serial No. 454,364. (No model.)

*To all whom it may concern:*

Be it known that we, FERDINAND B. MERRILL and GEORGE H. LOVELL, citizens of the United States, residing at Yarmouth, in the county of Cumberland and State of Maine have invented certain new and useful Improvements in Soldering-Irons for Cans; and we do hereby declare the following to be a full, clear, and exact description of the invention, such as will enable others skilled in the art to which it appertains to make and use the same.

This invention relates to soldering irons for cans, especially those containing canned goods, which are to be closed thereby. Such cans are provided with a circular groove in the top for holding acid and solder to fasten on the tin cap or cover; and such irons are provided with a central rod which serves as an axis about which the tubular body of the iron may turn and also holds the cap down in place during soldering, the said body having an edge which fits into the said groove and melts the solder. But in the hurry of canning corn and other food the cap end of the can often is not wiped clean, so that bits of dirt and rubbish get into the groove and make breaks in the soldering.

The object of our invention is to obviate this defect; to which end we make use of a clearing pin which is sufficiently weighted to work down through the operative end of the said soldering iron into the said groove and, as the iron is turned, to clean out the said groove.

Our invention consists in this pin combined with the other necessary parts of the tool. More than one such pin may be employed if preferred. The iron may be operated either by hand or by machinery.

In the accompanying drawings Figure 1 represents a side elevation of a soldering iron embodying our invention. Fig. 2 represents a longitudinal section of the same and a part of the can below; and Fig. 3 represents a plan view of the iron and pin.

A designates the tubular shank of the soldering iron, B the head, screw-threaded on the lower end of it and having a heating edge $b$, C the wooden grasping-piece or handle attached to and surrounding the upper end of the said shank, D the axial rod extending down through the said shank and head and provided with a point $d$ at one end and a handle or top piece D' at the other, pressure on the said piece D' serving to fix the said point in the center of the cap F of the can. The said head has a channel B' through it from top to bottom for the working of the clearing pin E, which is weighted on its upper end E' and has its point $e$ above the circular groove $f$ in the top F' of the can, surrounding the cap F.

As the head B and shank A, constituting the soldering iron, are turned the point $e$ sweeps around in the groove $f$ and cleans it, while the edge through which the said point works, does the soldering. The point $d$ of the rod D holds down the cap F during the operation of soldering and also when the edge $b$ is raised from the groove.

Having thus described our invention, what we claim as new, and desire to secure by Letters Patent, is—

1. A soldering iron for cans provided with an appliance attached to the heating part of the said iron for clearing the soldering groove of the can for the purpose set forth.

2. A soldering iron for cans provided with a longitudinally sliding pin attached to the heating part of the said iron and arranged to enter and clear the soldering groove of the can substantially as set forth.

3. A soldering iron having a longitudinal channel in its soldering head, in combination with a soldering, scraping or cleaning pin arranged to work through the said channel substantially as set forth.

4. A soldering iron having a longitudinal channel in its head in combination with a soldering, scraping or cleaning pin which is weighted to descend through the said channel and has its point arranged in the solder heating edge of the iron substantially as set forth.

In testimony whereof we affix our signatures in presence of two witnesses.

FERDINAND B. MERRILL.
GEO. H. LOVELL.

Witnesses:
EDWARD H. WILSON,
L. R. COOK.